United States Patent
Shibuya

(10) Patent No.: US 7,016,896 B2
(45) Date of Patent: Mar. 21, 2006

(54) PATTERN SEARCH METHOD, PATTERN SEARCH APPARATUS AND COMPUTER PROGRAM THEREFOR, AND STORAGE MEDIUM THEREOF

(75) Inventor: Tetsuo Shibuya, Yamato (JP)

(73) Assignee: International Business Machines Corporation, Armonk, NY (US)

(*) Notice: Subject to any disclaimer, the term of this patent is extended or adjusted under 35 U.S.C. 154(b) by 595 days.

(21) Appl. No.: 10/043,564

(22) Filed: Jan. 11, 2002

(65) Prior Publication Data
US 2002/0123995 A1 Sep. 5, 2002

(30) Foreign Application Priority Data
Jan. 11, 2001 (JP) .............................. 2001-004189

(51) Int. Cl.
G06F 17/30 (2006.01)
(52) U.S. Cl. ............................................. 707/6; 707/3
(58) Field of Classification Search .................... 707/6, 707/7, 100, 3; 435/6; 702/19
See application file for complete search history.

(56) References Cited

U.S. PATENT DOCUMENTS

| 6,526,401 B1 * | 2/2003 | Ito .................................. 707/3 |
| 6,633,817 B1 * | 10/2003 | Walker et al. ................. 702/19 |
| 2001/0056414 A1 * | 12/2001 | Christal et al. ................ 707/6 |
| 2002/0102545 A1 * | 8/2002 | Shibuya ......................... 435/6 |

* cited by examiner

Primary Examiner—Sam Rimell
(74) Attorney, Agent, or Firm—Richard M. Goldman

(57) ABSTRACT

A fast search is performed of a large text database, while suppressing an increase in the data size of the data structure used for the process. A pattern search method for searching a target character string for a desired pattern includes: a range search step and a character string extraction step. At the range search step, intermediate patterns are obtained by adding characters in order, one by one, from the last character of the pattern to the first, and a range is determined for a suffix array, which corresponds to the target character string, wherein the first character of each of the intermediate patterns is present. Then, at the character string extraction step, elements of the character string are designated that correspond to elements included in the range of the suffix array, and character string segments are extracted consisting of the same number of elements as the elements of the pattern and having the elements of the character string as their first characters.

15 Claims, 5 Drawing Sheets

| i, c | i | m | p | s | $ |
|---|---|---|---|---|---|
| 1 | 0 | 1 | 1 | 2 | 0 |
| 2 | 1 | 1 | 2 | 3 | 1 |
| 3 | 4 | 1 | 2 | 4 | 1 |

Fig. 4

| i, c | i | m | p | s | $ |
|---|---|---|---|---|---|
| 1 | 0 | 0 | 1 | 2 | 4 |
| 2 | 0 | 1 | 1 | 2 | 3 |
| 3 | 0 | 3 | 3 | 3 | 4 |

Fig. 5

PATTERN SEARCH METHOD, PATTERN SEARCH APPARATUS AND COMPUTER PROGRAM THEREFOR, AND STORAGE MEDIUM THEREOF

BACKGROUND OF THE INVENTION

1. Field of the Invention

The present invention relates to a data structure used to search an array for a frequently appearing segment, such as a character string, or to search for an array segment that is common to two or more arrays, and to a pattern search method using this data structure.

2. Related Art

A suffix tree is a well known data structure that can be effectively employed to perform a quick search of character strings for a frequently appearing segment or for a character string segment used in common in two or more character stings. A suffix tree is one in which all the suffixes in a character string are represented by adding, to the end of a process target character string, the character $, which is not present in the character strings that are processed. The leaf nodes (nodes, at the ends of edges, to which no edges are connected) of a suffix tree correspond to individual suffixes.

When a specific character is designated in a predetermined character string, the suffix is a character string that follows the specific character.

In FIG. 6 is shown a diagram of an example suffix tree. In FIG. 6, the suffix tree is constructed for a character string "mississippi$", obtained by adding the character $ to the end of the process target character string "mississippi".

Appended to each edge of the suffix tree is a label corresponding to a character string segment, and the arrangement of the labels appended to the edges descending from the root node to a leaf node is employed to define the pertinent leaf node as a suffix. In the example in FIG. 6, "issippi" is a suffix corresponding to the leaf node that is reached from the root node via edges to which the labels "i", "ssi" and "ppi" are appended. Similarly, "ssissippi" is a suffix for a leaf node that is reached from the root node via edges to which the labels "s", "si" and "ssippi" are appended.

Further, a different first character may be provided for each label appended to each edge extending from a single node (including the root node) in the suffix tree, and the edges are sorted in accordance with the first character of each label. In the example in FIG. 6, the edges are arranged in alphabetical order (in the order i, m, p and s) from left to right.

An algorithm O(n log s), wherein n denotes the length of the target character string, and s denotes the size (the number of character types) of the alphabetical entry constituting the character string, is a well known algorithm used for the generation of a suffix tree. The O(n) algorithm is especially well known as one that is used when an integer alphabet (the numbers from 1 to n) is used. The meaning of O(func(n)) is that when the actual calculation time is t, a pair of constants c and k is always present, so that $0 \leq t \leq c \times func(n)$ is established for n ($n \geq k$). Therefore, O(n log s) means that the calculation can be performed within a constant time period represented by n log s, and O(n) means that the calculation can be performed within a constant time period represented by n (in this case, within a constant time, since n is also a constant).

When this algorithm is employed, the search for a character string segment having a length m can be performed within a time period corresponding to O(m log s). And since the size of the alphabet used is normally a constant, this period can be calculated as a linear time. The memory capacity required for a storage device used to process a suffix tree for English text (n characters) is 20n to 40n bytes.

Since the data size of a suffix tree is large, to reduce this size, a well known suffix array is used as the data structure when a search is mounted for a similar pattern. As is described above, each the leaf nodes of a suffix tree corresponds to the suffix of a character string. When the suffixes are arranged, beginning at one end (the left in FIG. 6) of the suffix tree with the suffix corresponding to a leaf node, an array can be obtained wherein all the suffixes of a process target character string are listed in order, as in a dictionary. It should further be noted that the end character $ is placed at the end of each suffix.

The suffixes, which are the elements of the array, are replaced by entries representing the positions of the first character of each suffix in the target character string; for example, "ippi$" is replaced by "8" and "issippi$" is replaced by "5". As a result, an array (a suffix array) is obtained that has the same length as the target character string. In FIG. 6, for example, the suffix array for "mississippi$" is "8 5 2 11 1 10 9 7 4 6 3 12". In this case, it is assumed that the character $ is placed after all the other characters, in accordance with the dictionary order.

When a suffix array is employed, compared with when a suffix tree is used, the memory capacity required for a search mounted for a character string is reduced. Further, since a binary search is performed, the time required for the character string search for a is O(p log q), where q denotes the size of a database and p denotes the length of the character string to be searched for. Generally, since the required memory capacity is four bytes for each character, for text consisting of English characters (one byte each), 5n bytes are required for a database containing n characters of text.

Further, a table reflecting a common prefix length for adjacent suffixes can also be provided. And when such a table is employed, compared with when only a suffix tree array is employed, the search time can be reduced to O(p+log q). In this case, 9n bytes are required for the database.

SUMMARY OF THE INVENTION

When the above described suffix tree or suffix array is employed as a data structure when searching a large text database, the following problems have arisen.

First, when a suffix tree is employed as a data structure, a large database is required.

As is described above, when the length of a process target character string is n, the memory capacity, i.e., the database size, required by a storage device when handling a suffix tree for text is 20n to 40n bytes. Generally, when a suffix tree is used as a data structure, four to six times the capacity is required for a storage device as when a suffix array is employed (for a suffix array, 5n bytes are required for text consisting of n one-byte characters).

Therefore, it is difficult to employ a suffix tree for a large text database.

And when a suffix array is employed as a data structure, an extended period of time is required for a search. Since a binary search is performed for the suffix array, the required time is equivalent to O(p log q), where q denotes the size of a database and p denotes the length of a character string to be searched for. Therefore, if the size of an alphabet is a constant, compared with the linear time that a suffix tree search requires, the time required for the calculations performed for a dichotomous, suffix array search is enormous.

In addition, even though, as is described above, the calculation time can be reduced to O(p+log q) when an increase in data size is more or less permitted and a table reflecting common prefix lengths for adjacent suffixes in a suffix array is included in a database, since the term log q is unchanged, compared with when a suffix tree is employed, an enormous calculation time is required for a suffix array.

It is, therefore, one object of the present invention to perform a fast search of a large text database, while suppressing an increase in the data size of a data structure used for the process.

To achieve the above object, according to the present invention, a pattern search method for searching a target character string for a desired pattern comprises: a range search step and a character string extraction step performed as follows. At the range search step, intermediate patterns are obtained by adding characters in order, one by one, from the last character of the pattern to the first, and a range is determined for a suffix array, which corresponds to the target character string, wherein the first character of each of the intermediate patterns is present. Since this search is conducted beginning with the last character of the pattern, finally, the range of the suffix array, including the pattern itself, can be obtained. Then, at the character string extraction step, elements of the character string are designated that correspond to elements included in the range of the suffix array, and character string segments are extracted consisting of the same number of elements as the elements of the pattern and having the elements of the character string as their first characters.

This pattern search method can be used for a search of a character string consisting of various characters, such as alphabetical or Japanese text characters. In particular, when a desired pattern is to be extracted from a character string, such as binary data or a genetic array, consisting of a small number of character types, the size of the data structure used for the search can be reduced.

The range search step includes the steps of: designating a preposition character positioned immediately before the characters of the character string that correspond to the elements of the suffix array that is consonant with the target character string; obtaining the appearance count for a desired character, in the pattern, that is included among the preposition characters for the elements positioned before a specific element in the suffix array; and employing the obtained appearance count for the desired character to determine the position of the desired character in the suffix array.

According to the present invention, a pattern search method for finding a desired pattern in a search target array comprises the steps of: finding the location, in the array, of the last element of the desired pattern; and obtaining intermediate patterns, when the pattern consists of a plurality of elements, by adding elements one by one, beginning with an element located immediately before the last element, and determining the locations of the intermediate patterns in the array.

The present invention can be used not only for a pattern search using a suffix array, but also for a pattern search using a prefix array. That is, at the above range search step, intermediate patterns are obtained by adding characters in order, one by one, from the first character of the pattern to the last, and a range is determined for a prefix array, which corresponds to the target character string, wherein the last character of each of the intermediate patterns is present.

Since this search is conducted beginning with the first character of the pattern, finally, the range of the prefix array, including the pattern itself, can be obtained. Then, at the character string extraction step, elements of the character string are designated that correspond to elements included in the range of the prefix array, and character string segments are extracted consisting of the same number of elements as the elements of the pattern and having the elements of the character string as their last characters.

Furthermore, according to the invention, a pattern search apparatus for searching a search target character string for a desired pattern comprises: a pre-processor, for constructing a data structure to search for a pattern base in a suffix array for the target character string; and a search unit, for employing the data structure constructed by the pre-processor to search for the desired pattern, wherein, to construct the data structure, the pre-processor designates a preposition character positioned immediately before each character of the character string that corresponds to elements of the suffix array, and obtains, for each type of character forming the target character string, the number of preposition characters in the elements preceding a predetermined element in the suffix array.

The pre-processor includes a table in which the number of the preposition characters are correlated with the locations of the elements in the suffix array and with the types of characters forming the target character string.

The table can be a table generated to reflect the locations of elements in accordance with every predetermined count in the suffix array. That is, the data size of the data structure can be reduced by thinning out the data to be stored in the table.

Further, in this case, for the calculation of the number of preposition characters in a data thinning range, the pre-processor can include another table in which, based on predetermined locations in the suffix array for which information is managed by the table, information is stored that relates to the preposition characters for the elements in the suffix array lying between the predetermined locations.

According to the pattern search apparatus, the search unit obtains intermediate patterns by adding characters in order, one by one, from the last character of the pattern to the first, and determines a range for a suffix array, which corresponds to the target character string, wherein the first character of each of the intermediate patterns is present. Through this search, the range of the suffix array, including the pattern itself, can be obtained. Then, the search unit designates elements of the character string that correspond to elements included in the range of the suffix array, and extracts character string segments consisting of the same number of elements as the elements of the pattern and having the elements of the character string as their first characters.

According to the invention, a computer program, which permits a computer to conduct a search of a target array for a desired pattern, comprises: a process for obtaining intermediate patterns by adding elements in order, one by one, from the last element of the pattern to the first, and for determining the range of a suffix array, which corresponds to the target array, wherein the first element of each of the intermediate patterns is present; and a process for designating elements of the array that correspond to elements included in the range of the suffix array obtained for the pattern by the search, and for extracting an array segment that consists of the same number of elements as the elements of the pattern and that has the same elements of the array as have the first elements.

Further, according to the invention, a computer program, which permits a computer to search a target array for a desired pattern, comprises: a process for designating a preposition element positioned immediately before the elements of the array that correspond to the elements of the suffix array that is consonant with the target array; a process for obtaining, for each type of element of the array, the number of preposition elements for elements that are located before a predetermined element in the suffix array; a process for, based on the number of preposition elements of the elements located before the predetermined element in the suffix array, obtaining intermediate patterns by adding elements in order, one by one, from the last element of the pattern to the first, and determining a range for the suffix array, which corresponds to the target array, wherein the first element of each of the intermediate patterns is present; and a process for designating the elements of the array that correspond to elements included in the range of the suffix array that is obtained for the desired pattern by the search, and for extracting an array segment that consists of the same number of elements as the elements of the pattern and that has the same elements of the array as have the first elements.

These computer programs can be provided for use by storing them on a magnetic disk or another storage medium. Further, the computer programs may also be provided for use by transmitting them via a network, such as the Internet.

BRIEF DESCRIPTION OF THE DRAWINGS

FIG. 4 is a diagram showing an example structure for a table F used for this embodiment.

FIG. 5 is a diagram showing an example structure for a table L used for this embodiment.

DESCRIPTION OF THE PREFERRED EMBODIMENT

The preferred embodiment of the present invention will now be described in detail while referring to the accompanying drawings.

Figure 1:
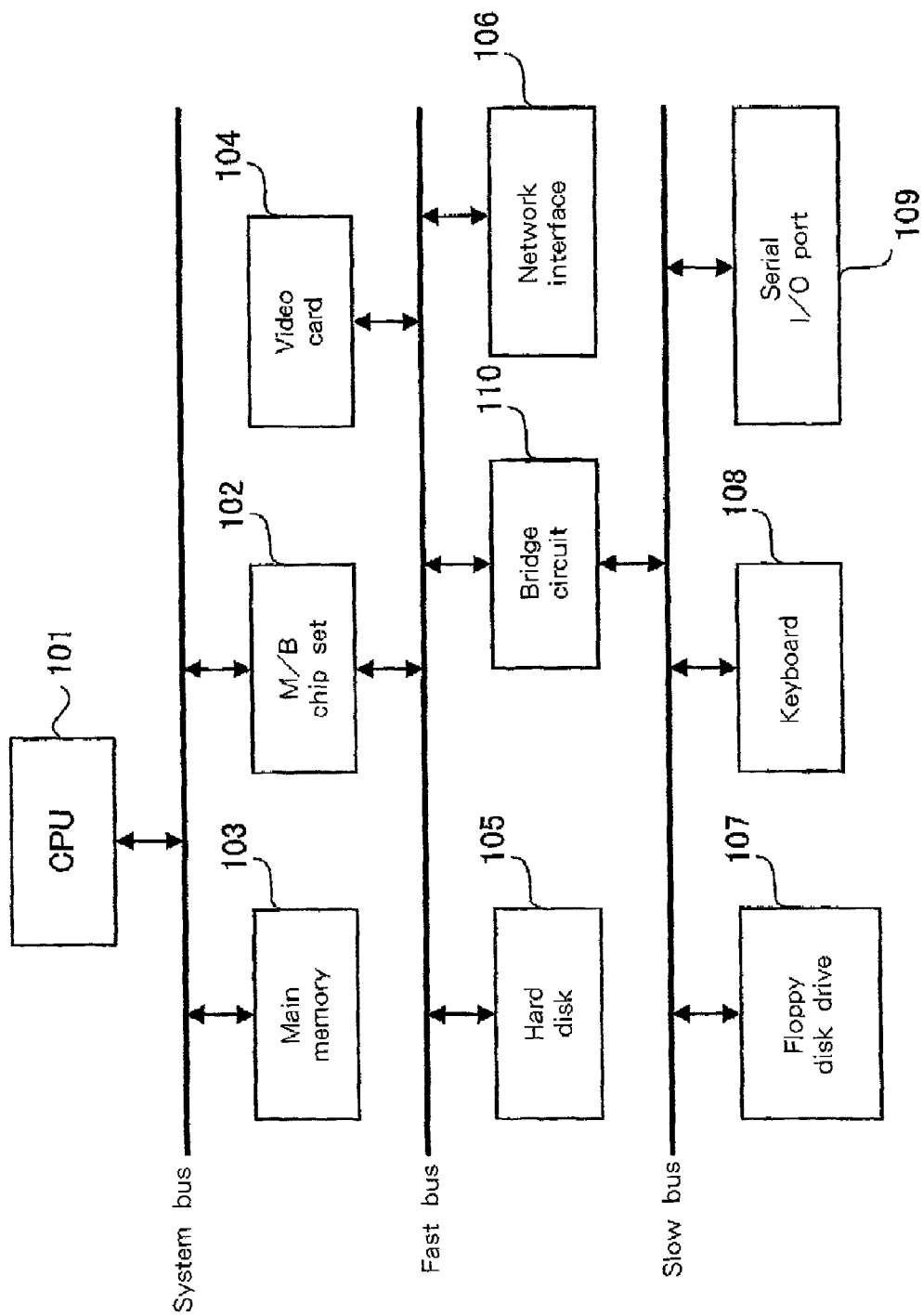
FIG. 1 is a specific diagram showing an example hardware configuration for a computer that is appropriate for implementing one embodiment of the invention.

FIG. 1 is a specific diagram showing an example hardware configuration for a preferred computer that implements the embodiment.

The computer in FIG. 1 comprises: a CPU (Central Processing Unit) 101; an M/B (motherboard) chip set 102 and a main memory 103, which are connected to the CPU 101 via a system bus; a video card 104, a hard disk 105 and a network interface 106, which are connected to the M/B chip set 102 via a fast bus, such as a PCI bus; and a floppy disk drive 107, a keyboard 108 and a serial I/O port 109, which are connected to the M/B chip set 102 via slow buses, such as a bridge circuit 110 and an ISA bus.

The configuration of the computer in FIG. 1 is merely an example for carrying out a search method according to the embodiment; various other system configurations can be employed so long as the embodiment can be applied.

In this embodiment, the CPU 101 is controlled by a program developed in the main memory 103 in FIG. 1, so that a desired character string segment is found in a predetermined character string (an array for which characters constitute elements) (hereinafter, a target character string is referred to as text, and a character string segment to be searched for is referred to as a pattern).

Figure 2:
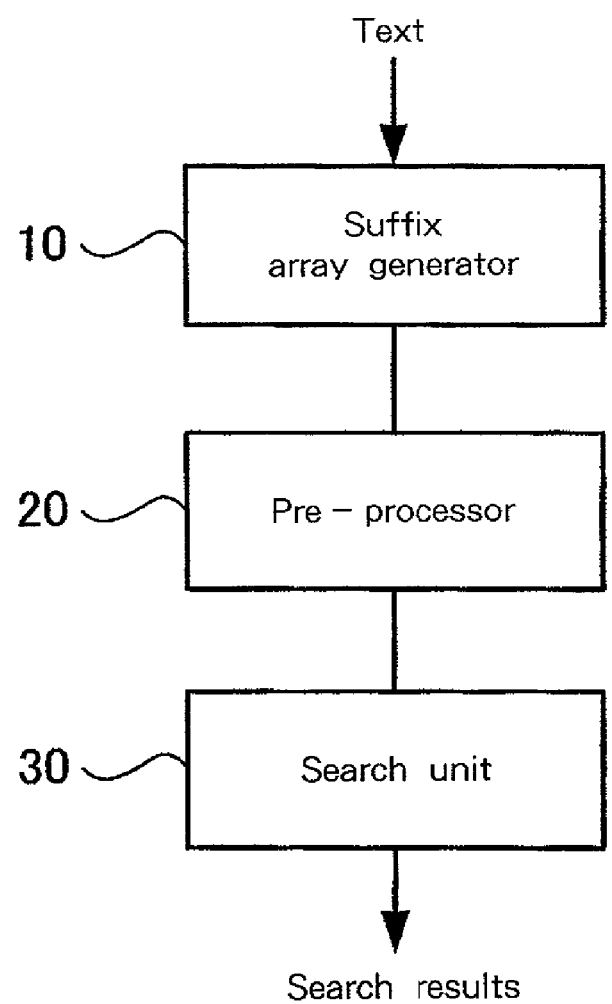
FIG. 2 is a diagram showing functional blocks used to construct a data structure and to conduct a search according to the embodiment.

FIG. 2 is a functional block diagram for the CPU 101 while under the control of a program for constructing a data structure and for conducting a search according to the embodiment.

In FIG. 2, the CPU 101 includes a suffix array generator 10, for generating a suffix array of text; a pre-processor 20, for converting the suffix array generated by the suffix array generator 10 and constructing a desired data structure; and a search unit 30, for employing the data structure obtained by the pre-processor 20 to search for a pattern.

As is described above, these components are virtual software blocks those functions performed by the CPU 101 while under the control of a program. This program can be provided by being stored on a magnetic disk, on an optical disk, in a semiconductor memory or on another storage medium, or by being transmitted via a network. In this embodiment, the program is input via the network interface 106, a floppy disk drive 107, or a CD-ROM drive (not shown), and is stored on a hard disk 105. The program stored on the hard disk 105 is read into the main memory 103 and developed therein, and is executed by the CPU 101.

In FIG. 2, the suffix array generator 10 obtains target text from a database (not shown), and generates a suffix array. An arbitrary, well known algorithm can be employed as the suffix array generation method. The target text and the obtained suffix array are stored in the main memory 103. Since the suffix array can be generated by employing various other well known methods, and since a suffix array generated by an external apparatus can also be used for this embodiment, the suffix array generator 10 is not a requisite component. When the suffix array generator 10 is not provided, the target text and the suffix array thereof are stored directly in the main memory 103.

In the following explanation, assume that the target text is T[1 . . . n], a pattern to be searched for is P[1 . . . m], and the suffix array for the text T is SA[1 . . . n]. In this explanation, double quotation marks (" ") are used to set off the text T and the pattern P character strings, and quotation marks (' ') are used to set off the characters included therein.

For example, the text T, wherein the character $ is added at the end of "mississippi", is T[1 . . . 12]="mississippi$", where '$' is an end character, but in accordance with the dictionary order its character order is higher than that of any of the other characters, i.e., the character $ is positioned following all the other characters. To search for a three-character pattern "ssi" in the text T[1 . . . 12], the search pattern P is P[1 . . . 3]="ssi". When T[5]='i' (fifth character) is represented in the text T, the suffix array SA for the text T is SA[1 . . . 12]={8 5 2 11 1 10 9 7 4 6 3 12}. It should be noted that the end character '$' may be handled as a conceptual character, and during the actual processing may not be stored in the main memory 103. In this case, to access T[i], a branching condition is established whereunder the character i is '$' when i=12. For example, when 256 characters are included in the text T and the text T will exceed in size the character count available with one byte if '$' is handled as a character, it is preferable that '$' not be stored in the main memory 103.

The pre-processor 20 reads the suffix array SA obtained by the suffix array generator 10, and employs the suffix array SA to build the data structure used to detect, in a target character string, data defined by f(i,c) (i is a positive integer equal to or smaller than n, and c is a character). In this case, f(i,c) is the number j that satisfies T[SA[j]−1]=c (j≦i). Assume array B is B[i]=T[SA[i]−1]. That is, the array B is an array of characters (preposition characters) that are located immediately before the individual characters in the text T that correspond to the elements of the suffix array SA. For example, B[4]=T[SA[4]−1]=T[10]='i'. Similarly, all the characters in the array B are written as follows.

B[1 . . . 12]="ssmp$pissiii".

Therefore, the value f(i,c) can be represented by the number of characters c following the index in the array B that is equal to or smaller than i. For example, f(6,'s')=2, f(6,'p')=2 and f(6,'m')=1. For i where i>n is established, f(i,c)=f(n,c) is defined, and for i where i≦0 is established, f(i,c)=0 is defined.

When the data for f(i,c) is maintained as a table, data corresponding to f(i,c) can be immediately obtained by providing parameters i and c. This is effective for the text T, such as a character string of binary data (two types: 0, 1) or a DNA array (four types: adenine (A), thymine (T), guanine (G) and cytosine (C)), that consists of an extremely small number of character types (s). However, when a large number of character types (s) are employed, the data array to be maintained as a table is extremely large, and this is not practical. Therefore, the pre-processor 20 constructs the data structure to calculate f(i,c) in the following manner.

(1) Preparation of a Table F

Assume that k is a positive integer equal to or smaller than an appropriate n. First, a table for f(k*i,c) is prepared for all the positive integers i (k*i<n+k). This process corresponds to a process for delimiting the text T for every k characters, and for obtaining f(i,c) for every k-th character and preparing the table. Since the value f( ) is equal to or smaller than n, the size of the table is (n*s log n)/k bits. This is O(n*s/k) words (i.e., within integer times n*s/k) for a general case wherein n falls within one word. This table is defined as F: F[i][c]=f(k*i,c). It should be noted that this table F can be formed within a period of time that is proportionate to a greater size, either the size of a table or the size of text.

Since this table F is maintained, f can be obtained within the time O(1) for the index integer times k. Thus, the data structure for obtaining the value of f will now be explained for an index other than integer times k. Thus, while assuming that g(i,c,j) is the j-th p that satisfies T[SA[p]−1]=c, where k*(i−1)<p≦k*i), the data structure for obtaining g(i,c,j) will now be described.

(2) Preparation of Table L

Assume that h(i,c) is f(k*i,c)−f(k*(i−1),c). This can be calculated immediately from the table F. l(i,c) is held as a table as the total of h(i,d) (d<c, dictionary order). When this table is defined as L, L[i][c]=l(i,c). The size of this table L is (n*s log k))/k bits.

(3) Preparation of a Table G

In the range r (0<k*r<n+k), the integers q, which satisfy 0<q≦k and with which the same value T[SA[q+k*(r−1)]−1] is obtained are rearranged in dictionary order, so that the table G[r][1 . . . k] is formed. At this time, the integers q, for which the dictionary order is the same in accordance with T[SA[q+k*(r−1)]−1] values, are arranged so that a smaller value of q comes first. It should be noted, however, that when $$r = \lceil n/k \rceil \quad \text{[Equation 1]}$$

is established, only those integers q that satisfy 0<q≦n−(r−1)k are arranged. This is because the number of characters included in the range r that satisfies equation 1 may not reach k. That is, as is described above, the text T is delimited for every k characters to prepare the table F; however, since the number of characters following the final delimiter does not reach k when the character count of the text T can not be fully divided by k, the integers q that satisfy 0<q≦n−(r−1)k are arranged. The overall size of the array for the table G is n, or is represented as n long k bits. This can be obtained in the following manner:

```
for all c (all the characters) w(c)=1;
for (q=1; q≦k; q++) {
    c=T[SA[q+k*(r−1)]−1];
    G[r][L[r,c]+w(c)]=q;
    w(c)=w(c)+1;
}
```

When the value of r satisfies equation 1, the "for" loop is (q=1; q≦n−(r−1)k; q++).

(4) Calculation of f(i,c)

When the thus obtained tables G and L are employed, g(i,c,j) can be represented as g(i,c,j)=G[i][L[i][c]+j]+k*(i−1).

Therefore, g(i,c,j) can be obtained within the time O(1) from the two tables G and L. For j that satisfies k*(j−1)<j≦k*i, the number of the ps that satisfy T[SA[p]−1]=c (where k*(i−1)<p≦j) is defined as f'(j,c). In the interval x (0<x≦h (i,c)), the maximum x, with which the value g(i,c,x) is equal to or smaller than j, is obtained as f'(j,c)=x.

Since the values for g(i,c,x) are arranged in the ascending order, the value of x can be calculated using O(log h(i,c)) through a binary search. Since h(i,c)<k, O(log k) is employed (since the average of h(i,c) is k/s, actually, a shorter time is required for the calculation). When such a value for x is not present, f'(j,c)=0.

With this assumption, f(j,c) is obtained as f(j,c)=F[i−1][c]+f'(j,c).

Therefore, f(j,c) can be calculated using O(log k) and the above described data structure.

Since (n*s log n)/k bits, (n*s log k))/k bits and n log k bits are respectively required to represent the tables F, L and G, (n*s/k)*(log n+log k)+n log k bits is the total. These tables F, L and G are stored in the main memory 103. For the actual operation, n log n bits for the suffix array SA and n log s bits for the text T are additionally required as the memory capacity of the main memory 103.

The pre-processor 20 also includes the following table C for the text T, in addition to the above described data structures. The element C[c] of the table C represents the total number of characters that are included in the text T and is equal to or less than c. In this case, the character equal to or less than c, means c or another character that in accordance with the dictionary order comes earlier. The table C, as well as the other data structures, is stored in the main memory 103. The size of the table C is s log n bits, and relative to the text T, the time required to obtain the table C is linear. When a small value of k is set, to obtain f(i*k,c) where j=i*k+d (d<k), a method may be employed whereby, while the tables L and G are not prepared, the value f(i*k,c), obtained from the table, F and the value i*k+1 are employed to count the number of elements wherein the value of T[SA[j]−1] is c. Since the calculation time required for this method is O(k), this method is effective for a k having a small value that is near that of log k. Since the tables L and G are not prepared for this method, the required memory capacity is reduced.

The search unit 30 employs the above data structure prepared by the pre-processor 20 to search for a desired pattern P in the text T. The search, for which f(i,c) is used, is performed as follows.

```
start=C[P[m]-1]+1;
end=C[P[m]];
for each i (m-1≧i≧1, descending order) {
    c=P[i];
    start=C[c-1]+f(start,c)
    end=C[c-1]+f(end,c);
    if (end<start) {
    The search is terminated since the pattern is not present.
    }
}
```

It should be noted that, for the character c, c+1 represents a character that follows the character c in dictionary order, that c−1 represents a character that precedes the character c in dictionary order, and that c[a−1] represents 0, in dictionary order, the lowest alphabetical character a.

Figure 3:
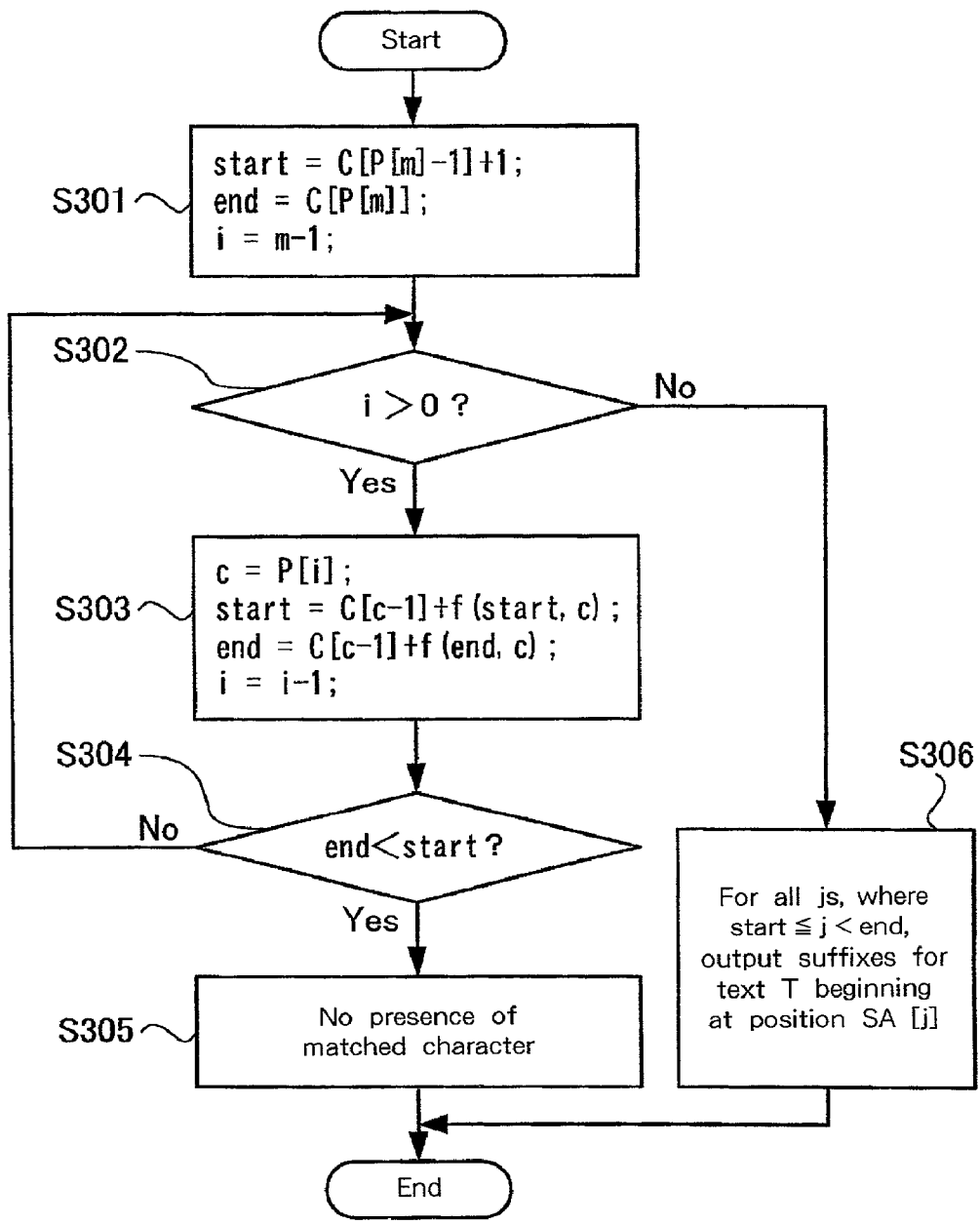
FIG. 3 is a flowchart for explaining a pattern search algorithm according to the embodiment.
Figure 6:
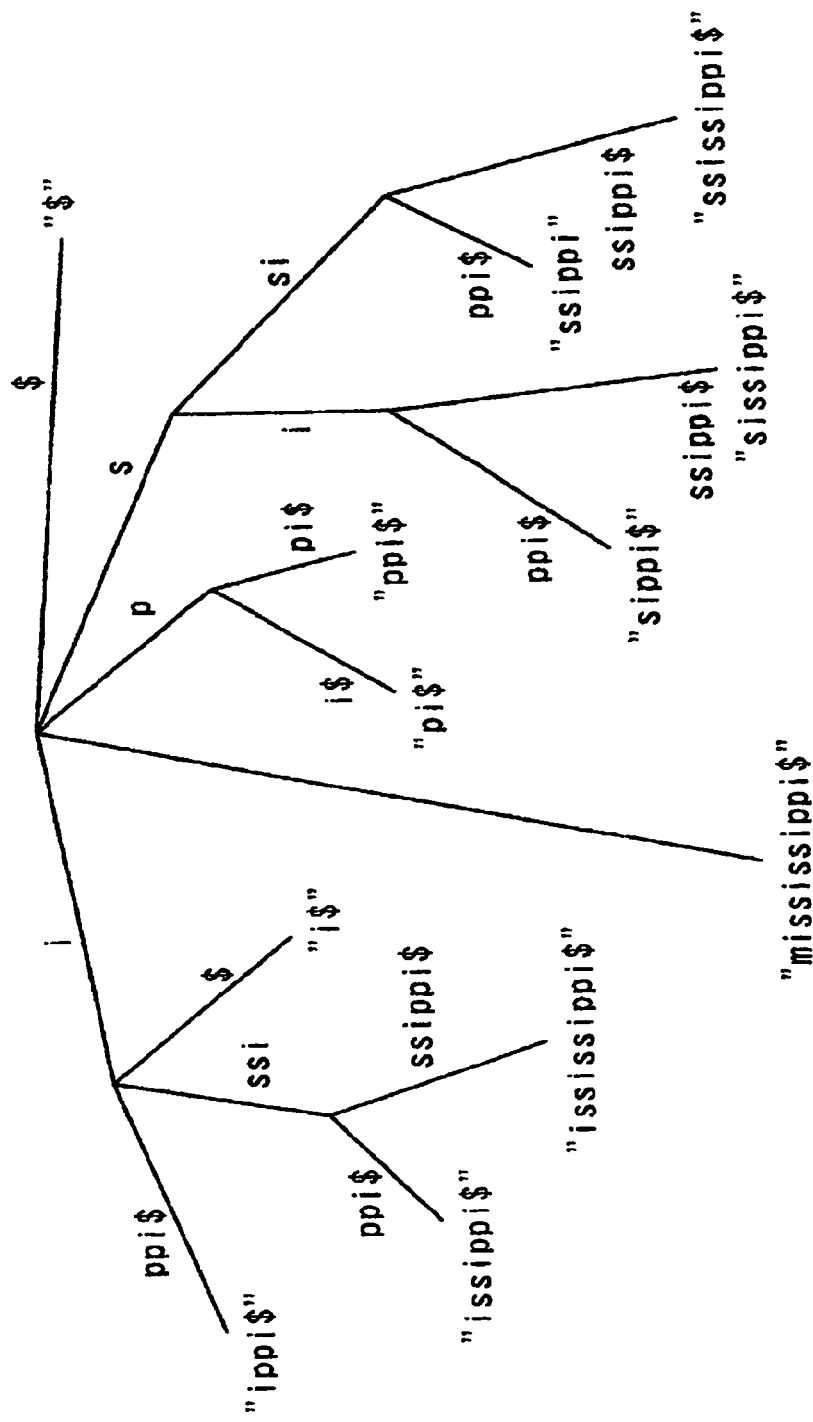
FIG. 6 denominated "Prior Art", is a diagram showing an example suffix tree.

FIG. 3 is a flowchart for the above search algorithm. The pattern search processing for this embodiment will now be described while referring to FIG. 3. A feature of this method is that a search for a pattern begins at the end of the character string of the pattern. According to the search algorithm in FIG. 3, since a pattern to be obtained is present at the location beginning with SA[j] (start≦j≦end) in the suffix array SA of the text T, these patterns need only be enumerated.

In FIG. 3, first, the search unit 30 substitutes C[P[m]−1]+1 into the value for start, substitutes C[P[m]] into the value for end, and the values of start and end are calculated. Further, i=m−1 is defined (step 301). Then, a check is performed to determine whether the value of i is positive (i>0). If the value of i is positive, C[c−1]+ f(start,c), where c=P[i], is substituted into start, C[c−1]+f(end,c) is substituted into end, and the values of start and end are obtained. Further, i=i−1 is defined (steps 302 and 303). Next, a check is performed to determine whether the value of end is smaller than the value of start. When the value of end is smaller than the value of start, it is ascertained that a character string that matches the search pattern P is not present and the search processing is terminated (steps 304 and 305). When the value of end is not smaller than the value of start, program control returns to step 302 and the values of start and end are obtained for a new i (step 304). When the value of 1 is equal to or smaller than 0 at step 302, the values of the start and the end are employed to output suffixes for the text T that begins at the position SA[j], where j is start≦j≦end. The processing is thereafter terminated (step 306). At this time, the suffix matches the search pattern P.

The construction of the data structure by the pre-processor 20 and the search for the pattern P by the search unit 30 will now be described for a case wherein T[1 . . . 12]="mississippi$"
P[1 . . . 3]="ssi"
SA[1 . . . 12]={8 5 2 11 1 10 9 7 4 6 3 12}.

In this embodiment, as a reference for delimiting the text T, k=4.

First, the table F is prepared when k=4. As is described above, f(k*i,c) is substituted into F[i][c]. Since k*i< n+k and n=12, the values of i when k=4 are 1, 2 and 3. Therefore, the value of f(4*i,c) is entered in the table F for i=1, 2 and 3 and c='i', 'm', 'p', 's' and '$', and the results are as shown in FIG. 4. Since, for example, f(4*2,'p') is obtained for F[2]['p'], two 'p's are present before the eighth (=4*2) character 's' in the array B[1 . . . 12]="ssmp$pissiii". Therefore, a value of 2 is entered for F[2]['p'] in the table F. The entry for '$' is also included in the table F in FIG. 4; however, the inclusion of '$', in the search pattern need not actually be taken into account, and the column for '$' can be removed.

Next, the table L is prepared. As is described above, when h(i,c) is defined as f(4*i,c)−f(4*(i−1),c), and l(i,c) is defined as the total for h(i, d) (d<c, dictionary order), the order of the character c is 'i'<'m'<'p'<'s'<'$', and the table L shown in FIG. 5 is obtained. For example, L[2]['s'] is the sum of h(2,'i'), h(2,'m') and h(2,'p'), and as is apparent from the table F in FIG. 4, $$h(2, 'i') = f(4*2, 'i') - f(4*(2-1), 'i')$$
$$= f(8, 'i') - f(4, 'i')$$
$$= 1 - 0 = 1,$$

i.e., there is one 'i' present in the array B[5 . . . 8]. Similarly, h(2,'m')=f(8,'m')−f(4,'m')=1−1=0
h(2,'p')=f(8,'p')−f(4,'p')=2−1=1.

Therefore, a value of 2 (=1+0+1) is entered in L[2]['s'] in the table L.

By referring to FIGS. 4 and 5, in the table L there is a relationship

L[i][c+1]=L[i][c]+F[i][c]−F[i−1][c], where c+1 is a character succeeding the character c in dictionary order, and F[0][c]=0. For example, L[2]['s'] described above can be represented as $$L[2]['s'] = L[2]['p'] + F[2]['p'] - F[1]['p']$$
$$= 1 + 2 - 1 = 2$$

Therefore, when the table L is prepared only for every x characters, and the values for the characters that are skipped are calculated using the tables L and F, a savings in memory can be realized. In this case, the calculation time for this portion is x times. It should be noted that, as was the case in FIG. 4, the column '$' can be removed from the table L.

Following this, the table G is prepared. As is described above, the elements r (0<4*r<n+4), for which the same value of T[SA[q+4*(r−1)]−1] (0<q≦4) is obtained, are rearranged in dictionary order, and the table G[r][1 . . . 4] is obtained (it should be noted, however, that 0<q≦n−(r−1)*4 when the value of r satisfies equation 1). At this time, [SA[q+4*(r−1)]−1] corresponds to B[1 . . . 4], B[5 . . . 8] or B[9 . . . 12] in the array B. Therefore, since G[1][1 . . . 4] is, for example, B[1 . . . 4]="ssmp", when corresponding integers q=1, 2, 3 and 4 are rearranged in the dictionary order 's', 's', 'm' and 'p',

G[1][1 . . . 4]={3, 4, 1, 2} is obtained (between 's' for q=1 and 's' for q=2, the 's' having the smaller integer q comes first). Similarly, in the case where r=2, 3, the following equation is obtained

G[1 . . . 3][1 . . . 4]
={3, 4, 1, 2}, {3, 2, 4, 1}, {2, 3, 4, 1}.

A specific calculation example will now be explained wherein g(i,c,j), f(j,c) and f'(j,c) are to be calculated using the tables F, L and G. First, g(3,'r',2) can be obtained as $$g(3, \text{'r'}, 2) = G[3][L[3]['1'] + 2] + 4*(3-1)$$
$$= G[3][0+2] + 8$$
$$= 11$$

Further, to obtain f'(10,'i'), the maximum x having a value of equal to or smaller than 10 need only be selected from g(3,'i',x) (0<x≦3). In the same manner, g(3,'r',1) and g(3,'r',3) can be obtained as g(3,'r',1)=10
g(3,'r',3)=12, so that f'(10,'i')=x=1 is acquired.

Further, through calculation, the value f(10,'i') is f(10,'i')=F[2]['i']+f'(10,'i')=1+1=0.

Next, a search of

P[1 . . . 3]="ssi"

is conducted by using the above described data structure. According to the algorithm shown in the flowchart in FIG. 3, first, C[P[3]−1]+1=C[i−1]+1=0+1=1 is substituted into "start", and C[P[3]]=C[i]=4 is substituted into "end" (see step 301). This means the range of the suffix array SA, which corresponds to the text T, wherein P[3]="i", which is an intermediate pattern used for the search, is positioned. That is, the elements of the text T that corresponds to SA[1 . . . 4]={8 5 2 11}, i.e., the eighth, the fifth, the second and the eleventh elements of the text T, match the intermediate pattern "i".

Following this, since i=2(=3−1)>0 (see step 301) P[i] is substituted into c (see steps 302 and 303), and the values to be substituted into "start" and "end" are calculated as follows:

$$\text{start} = C[P[2] - 1] + f(\text{start}, P[2])$$
$$= C['s' - 1] + f(1, 's')$$
$$= C['p'] + f(1, 's').$$

At this time, since k*i=1, f(1,'s') is not directly obtained from the table F, and C['p']+f(1,'s')=7+F[1−1]['s']+f'(1,'s')

is obtained. At this time, since F[0][c]=0, and since, when x=1, g(1,'s',x) is represented as $$g(1, 's', 1) = G[1][L[1]['s'] + l] + 4*(l-1)$$
$$= G[1][2+1]$$
$$= 1,$$

f'(1,'s')=1. Therefore,

C['p']+f(1,'s')=7+0+1=8, and a value of 8 is substituted into "start". Further, $$\text{end} = C[P[2] - 1] + f(\text{end}, P[2])$$
$$= C['p'] + f(4, 's')$$

is established. At this time, f(4,'s') can be directly obtained from the table F because k*1=4*1, and since F[1]['s']=2, C['p']+f(4,'s')=7+2=9.

Thus, a value of 9 is substituted into "end". This means that the range of the suffix array SA, which corresponds to the text T, wherein P[2 3]="si", which is the intermediate pattern used for the search, is present. That is, the pattern of the element count of 2, beginning with the elements of the text T that correspond to SA[8]={7} and SA[9]={4}, i.e., the seventh and the fourth elements of the text T, matches the intermediate pattern "si".

Then, since end (=9)>start (=8), program control returns to step 302 (see step 304), and since i=1 (=2−1)>0, program control advances to step 303 again and P[i] is substituted into c (see step 302). Then, the values to be substituted into start and end, i.e., $$\text{start} = C[P[1] - 1] + f(\text{start}, P[l])$$
$$= C['s' - 1] + f(8, 's')$$
$$= C['p'] + f(8, 's').$$

In this case, f(8,'s') can be directly obtained from the table F because k*i=4*2, and since F[2]['s']=3, C['p']+f(8,'s')=7+3=10 is obtained, and a value of 10 is substituted into "start. Further, $$\text{end} = C[P[1] - 1] + f(\text{end}, P[1])$$
$$= C['p'] + f(9, 's')$$

is established. In this case, f(9,'s') can not be directly obtained from the table F because k*i=11, and since i=3 is acquired in accordance with 4*(i−1)<9≦4*i, C['p']+f(9,'s')=7+F[3−1]['s']+f'(9,'s')

is obtained. At this time, F[2]['s'] is 3 by referring to the table F. Further, when x=1, g(3,'s',x) is represented as $$g(3, 's', 1) = G[3][L[3]['s'] + 1] + 4*(3-1)$$
$$= G[3][3+1] + 8 = 9,$$

and since this is the only solution, f'(9,'s')=x=1. Therefore,

C['p']+f(9,'s')=7+3+1=11 is obtained, and a value of 11 is substituted into "end".

Then, since end (=11)>start (=10), program control returns to step 302 (see FIG. 304), and since i=0 (=1−1) is established (see step 302), the suffixes of the text T beginning at the position SA[j] are obtained for all the integers j that satisfy start≦j≦end (see step 306). In this case, since start=10 and end=11 are obtained, SA[10]=6 and SA[11]=3, and T[3 . . . 5]=T[6 . . . 8]="ssi" is established, which matches the pattern P.

The operation has been explained when k=4; however, the value of k can be set, as needed, in accordance with the character count (n) of the target text T, the character count (m) of the search pattern P, and the number (s) of the character types in the alphabetical characters that constitute the text T. In this case, the memory capacity of the main memory 103, which is required for the pre-process and the search process, and the time required for these processes are changed in accordance with the value of k. When k=O(s) is roughly set, i.e., k is set as the constant times for s, the memory capacity required for the main memory 103 is O(n log n) bits, and the search time is O(m log s), which are the same as theoretical values obtained in accordance with the search method using the conventional suffix tree. When, for example, k=s, bits of 3n log s+2n log n are required. It should be noted that the bits required in this case are not always the minimum. Actually, since in many cases the memory capacity of the main memory 103 is a multiple (or a measure) of 8 bits, 16 bits or 32 bits, it is preferable that this be taken into account when the value of k is set.

Next, an explanation will be given for examples of the memory capacity (data size) required for the main memory 103 and the search time when the embodiment is applied for a specific text T.

EXAMPLE 1

Case wherein a character is represented by one byte and there are 256 types of characters (255 types when the end character $ is to be represented at the same time). In general, English text corresponds to this case.

When the character count of the text T is defined as n, the size of the text T is n bytes, and the size of the suffix array SA is 4n bytes. For example, when k=65536 (=$2^{16}$) is employed, the numbers equal to or smaller than k can be represented by two bytes. Thus, the total size of the tables F, L, G and C is a little more than 2n bytes. Therefore, the data size, even including the text T, the suffix array SA and the text T, is only a little over 7n bytes, which is only about one third of the size of the suffix tree (20n to 40n bytes) that corresponds to the text T. Since the search speed is proportional to log k, the speed can be increased by reducing the value of k. When, for example, k=256 (=$2^8$) is set, the twice the search speed can be expected than when k=65536. At this time, the memory capacity of the main memory 103 required for holding the tables F, L, G and C is 6n bytes. That is, the total data size of the text T and the suffix array SA is only 11n bytes, which is still smaller than the size of the suffix tree.

EXAMPLE 2

Case where a character is represented by two bytes, and there are 65536 (=$2^{16}$) character types. Japanese text corresponds to this case. When k=65536 is set, the total size of the tables F, L, G and C is 8n bytes, and the total data size, even including the text T and the suffix array SA, is only 14n bytes. It should be noted that in this case a small value of k, such as k=256, is not preferable because the data size will be increased.

EXAMPLE 3

Case of a DNA array (the number of character types is four). If the use of 2-bit characters and 4-bit characters is permitted, with k=4 the total data size for the tables F, L, G and C, the text T and the suffix array SA will be approximately 8.75n bytes. Further, when k=16, the total data size is about 5.375n bytes. The data size, especially in the second case, is substantially no different from the size of the suffix array SA.

An example for measuring the search speed for an actual DNA array will be explained. In this example, the calculation times are compared when the search method of this embodiment and of the conventional method for a binary search of the suffix array SA are employed, and the same query is repeated 10000000 times for all the arrays of a colon bacillus. It should be noted that an RS6000 (a workstation by IBM), which was equipped with a 333 MHz Power PC as the CPU, was employed for the calculations.

Search pattern P="CACATAA"
Search time required for this embodiment: 0.38 seconds
Search time required for a conventional binary search: 4.30 seconds
Search pattern P="AGAGCGGC"
Search time required for this embodiment: 0.47 seconds
Search time required for a conventional binary search: 4.02 seconds
Search pattern P="CCCGCTTCGGC"
Search time required for this embodiment: 0.76 seconds
Search time required for a conventional binary search: 3.35 seconds
Search pattern P="ACCGCGAAATACCGGCGCGGAAATCATCGACTTACGCATAGGCGC"
Search time required for this embodiment: 3.13 seconds
Search time required for a conventional binary search: 3.88 seconds
Search pattern P="CGGCGTCAGGTACTGACCGCGACCAATGCGA"
Search time required for this embodiment: 0.84 seconds
Search time required for a conventional binary search: 3.41 seconds As is described above, in all of these examples, the calculation time required by the method of this embodiment is shorter than that required for the binary search method (the speed was increased), and in the example wherein the processing speed was the highest (search pattern P="AGAGCGGC"), the speed was increased ten times or more. Further, it is apparent that, for a query for which a shorter array is used, the processing speed is increased the most.

In the above embodiment, the suffix array SA of the text T has been examined to find a desired pattern P. However, a prefix array for the text T may be examined to find the pattern P. The prefix is a character string preceding a specific character that has been designated, and as well as the suffix tree for the suffixes, a prefix tree can be generated for the prefixes. Further, the prefix array is an array of indexes when the character strings, for which in the text T all the prefixes are arranged in order, beginning with the last, are rearranged in dictionary order. That is, the prefix array is substantially the same as the suffix array for the text T when the beginning and the end (the left and the right) of a character string are inverted. Therefore, while taking direction into account, the above method can also be used, unchanged, for the prefix array.

As is described above, according to the invention, a large text database can be quickly searched, while an increase in the data size of the data structure used for the process is suppressed.

The invention claimed is:

1. A pattern search method for searching a target character string for a desired pattern comprising: a range search step of obtaining intermediate patterns by adding characters in order, one by one, from the last character of said pattern to the first, and determining a range for a suffix array, which corresponds to said target character string, wherein the first character of each of said intermediate patterns is present; and a character string extraction step of designating elements of said character string that correspond to elements included in said range of said suffix array obtained for said pattern by said search, and extracting character string segments consisting of the same number of elements as said elements of said pattern and having said elements of said character string as their first characters.

2. The pattern search method according to claim 1, wherein said range search step includes the steps of: designating a preposition character positioned immediately before said characters of said character string that correspond to said elements of said suffix array that is consonant with said target character string; obtaining the appearance count for a desired character, in said pattern, that is included among said preposition characters for the elements positioned before a specific element in said suffix array; and employing said obtained appearance count for said desired character to determine the position of said desired character in said suffix array.

3. A text database searching method including a pattern search method and a character string extraction method, said pattern search method comprising finding a desired pattern in a search target array by the steps of:
  finding the location, in said array, of the last element of said desired pattern; and
  obtaining intermediate patterns within the search target array, when said pattern consists of a plurality of elements, by adding elements one by one, beginning with an element located immediately before said last element, and determining the locations of said intermediate patterns in said array; and
  thereafter extracting a character string, designating elements of the character string that correspond to elements included in the search target array, and extracting character string segments from the character string, said character string segments consisting of the same number of elements as the elements of the pattern and having the elements of the character string as their first character.

4. A pattern search method for searching a target character string for a desired pattern comprising: a range search step of obtaining intermediate patterns by adding characters in order, one by one, from the first character of said pattern to the last, and determining a range for a prefix array, which corresponds to said target character string, wherein the last character of each of said intermediate patterns is present; and a character string extraction step of designating elements of said character string that correspond to elements included in said range of said prefix array obtained for said pattern by said search, and extracting character string segments consisting of the same number of elements as said elements of said pattern and having said elements of said character string as their last characters.

5. A pattern search method for searching a target genetic array for a desired pattern comprising: a range search step of obtaining intermediate patterns by adding elements in order, one by one, from the last element of said pattern to the first, and determining a range for a suffix array, which corresponds to said target genetic array, wherein the first element of each of said intermediate patterns is present; and an array extraction step of designating elements of said genetic array that correspond to elements included in said range of said suffix array obtained for said pattern by said search, and extracting array segments consisting of the same number of elements as said elements of said pattern and having said elements of said genetic array as their first characters.

6. A pattern search apparatus for searching a search target character string for a desired pattern comprising: a pre-processor, for constructing a data structure to search for a pattern base in a suffix array for said target character string; and a search unit, for employing said data structure constructed by said pre-processor to search for said desired pattern, wherein, to construct said data structure, said pre-processor designates a preposition character positioned immediately before each character of said character string that corresponds to elements of said suffix array, and obtains, for each type of character forming said target character string, the number of preposition characters in the elements preceding a predetermined element in said suffix array.

7. The pattern search apparatus according to claim 6, wherein said pre-processor includes a table in which the number of said preposition characters are correlated with the locations of said elements in said suffix array and with the types of characters forming said target character string.

8. The pattern search apparatus according to claim 7, wherein said table is a table generated to reflect the locations of elements in accordance with every predetermined count in said suffix array.

9. The pattern search apparatus according to claim 8, wherein, said pre-processor includes another table in which, based on predetermined locations in said suffix array for which information is managed by said table, information is stored that relates to said preposition characters for said elements in said suffix array lying between said predetermined locations.

10. The pattern search apparatus according to claim 6, wherein said search unit obtains intermediate patterns by adding characters in order, one by one, from the last character of said pattern to the first, based on the number of preposition characters in the elements preceding a predetermined element in said suffix array, and determines a range for a suffix array, which corresponds to said target character string, wherein the first character of each of said intermediate patterns is present; and wherein said search unit designates elements of said character string that correspond to elements included in said range of said suffix array obtained for said pattern by said search, and extracts character string segments consisting of the same number of elements as said elements of said pattern and having said elements of said character string as their first characters.

11. A computer program, which permits a computer to conduct a search of a target array for a desired pattern, comprising: a process for obtaining intermediate patterns by adding elements in order, one by one, from the last element of said pattern to the first, and for determining the range of a suffix array, which corresponds to said target array, wherein the first element of each of said intermediate patterns is present; and a process for designating elements of said array that correspond to elements included in said range of said suffix array obtained for said pattern by said search, and for extracting an array segment that consists of the same number of elements as said elements of said pattern and that has the same elements of said array as have the first elements.

12. A computer program, which permits a computer to search a target array for a desired pattern, comprising: a process for designating a preposition element positioned immediately before said elements of said array that correspond to said elements of said suffix array that is consonant with said target array; a process for obtaining, for each type of element of said array, the number of preposition elements for elements that are located before a predetermined element in said suffix array; a process for, based on said number of preposition elements of said elements located before said predetermined element in said suffix array, obtaining intermediate patterns by adding elements in order, one by one, from the last element of said pattern to the first, and determining a range for said suffix array, which corresponds to said target array, wherein the first element of each of said intermediate patterns is present; and a process for designating said elements of said array that correspond to elements included in said range of said suffix array that is obtained for said desired pattern by the search, and for extracting an array segment that consists of the same number of elements as said elements of said pattern and that has the same elements of said array as have the first elements.

13. The computer program according to claim 12, wherein a table is generated in which the number of said preposition elements are correlated with the locations of said elements in said suffix array and with the types of elements forming said target array.

14. A storage medium on which input means of a computer stores a computer-readable program that permits said computer to perform the processing for searching a target array for a desired pattern, and that includes, as said processing for searching a desired pattern: a process for obtaining intermediate patterns by adding elements in order, one by one, from the last element of said pattern to the first, and for determining the range of a suffix array, which corresponds to said target array, wherein the first element of each of said intermediate patterns is present; and a process for designating elements of said array that correspond to elements included in said range of said suffix array obtained for said pattern by said search, and for extracting an array segment that consists of the same number of elements as said elements of said pattern and that has the same elements of said array as have the first elements.

15. A storage medium on which input means of a computer stores a computer-readable program that permits said computer to perform the processing for searching a target array for a desired pattern, and that includes, as said processing for searching a desired pattern: a process for designating a preposition element positioned immediately before said elements of said array that correspond to said elements of said suffix array that is consonant with said target array; a process for obtaining, for each type of element of said array, the number of preposition elements for elements that are located before a predetermined element in said suffix array; a process for, based on said number of preposition elements of said elements located before said predetermined element in said suffix array, obtaining intermediate patterns by adding elements in order, one by one, from the last element of said pattern to the first, and determining a range for said suffix array, which corresponds to said target array, wherein the first element of each of said intermediate patterns is present; and a process for designating said elements of said array that correspond to elements included in said range of said suffix array that is obtained for said desired pattern by the search, and for extracting an array segment that consists of the same number of elements as said elements of said pattern and that has the same elements of said array as have the first elements.

* * * * *